US010789184B2

(12) United States Patent
Tsukidate et al.

(10) Patent No.: US 10,789,184 B2
(45) Date of Patent: Sep. 29, 2020

(54) VEHICLE CONTROL DEVICE

(71) Applicant: Hitachi Automotive Systems, Ltd., Hitachinaka-shi, Ibaraki (JP)

(72) Inventors: Tsunamichi Tsukidate, Tokyo (JP); Yusuke Abe, Hitachinaka (JP); Takeshi Fukuda, Tokyo (JP); Tomohito Ebina, Hitachinaka (JP); Fumio Narisawa, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 12 days.

(21) Appl. No.: 15/761,972

(22) PCT Filed: Oct. 26, 2016

(86) PCT No.: PCT/JP2016/081655
§ 371 (c)(1),
(2) Date: Mar. 21, 2018

(87) PCT Pub. No.: WO2017/090364
PCT Pub. Date: Jun. 1, 2017

(65) Prior Publication Data
US 2018/0253390 A1    Sep. 6, 2018

(30) Foreign Application Priority Data

Nov. 25, 2015 (JP) ................. 2015-229375

(51) Int. Cl.
*G06F 13/16* (2006.01)
*G06F 11/22* (2006.01)
(Continued)

(52) U.S. Cl.
CPC ........ *G06F 13/1663* (2013.01); *G06F 3/0613* (2013.01); *G06F 11/2242* (2013.01); *G06F 11/3495* (2013.01); *G06F 13/24* (2013.01)

(58) Field of Classification Search
None
See application file for complete search history.

(56) References Cited

U.S. PATENT DOCUMENTS 6,170,070 B1 * 1/2001 Ju .......................... G11C 29/08
714/718
6,763,432 B1 * 7/2004 Charney ............. G06F 12/0897
711/122
(Continued)

FOREIGN PATENT DOCUMENTS

JP    4-125753 A    4/1992
JP    2007-66246 A    3/2007
(Continued)

OTHER PUBLICATIONS

International Search Report (PCT/ISA/210) issued in PCT Application No. PCT/JP2016/081655 dated Jan. 31, 2017 with English-language translation (three (3) pages).
(Continued)

*Primary Examiner* — Sean D Rossiter
*Assistant Examiner* — Stephanie Wu
(74) *Attorney, Agent, or Firm* — Crowell & Moring LLP

(57) ABSTRACT

In the present invention, computational efficiency degradation is suppressed when diagnosing a shared storage area in a vehicle control device in which a plurality of computing units are employed. This vehicle control device suppresses computational efficiency degradation by changing an access destination in a storage device while diagnosing a shared storage area that the storage device has.

11 Claims, 16 Drawing Sheets

(51) Int. Cl.
*G06F 3/06* (2006.01)
*G06F 11/34* (2006.01)
*G06F 13/24* (2006.01)

(56) References Cited

U.S. PATENT DOCUMENTS

| | | | | | |
|---|---|---|---|---|---|
| 8,219,762 | B1* | 7/2012 | Shavit | ................. | G06F 12/0815 711/100 |
| 8,549,208 | B2* | 10/2013 | Lee | ................. | G06F 12/0846 711/3 |
| 9,449,717 | B2* | 9/2016 | Becker | ................. | G11C 29/14 |
| 2001/0000449 | A1* | 4/2001 | Satoh | ................. | G11C 29/26 365/120 |
| 2007/0055480 | A1 | 3/2007 | Endoh et al. | | |
| 2009/0216926 | A1* | 8/2009 | Matulik | ............. | G06F 13/4243 710/107 |
| 2010/0162042 | A1* | 6/2010 | Inoue | ................. | G06F 11/2025 714/11 |
| 2013/0173970 | A1* | 7/2013 | Kleveland | ............. | G11C 29/44 714/710 |
| 2013/0298132 | A1* | 11/2013 | Kurihara | ............. | G06F 9/4843 718/102 |
| 2013/0298136 | A1* | 11/2013 | Dakemoto | ................ | G06F 9/52 718/104 |
| 2014/0310488 | A1* | 10/2014 | Strange | ................. | G06F 3/0667 711/162 |
| 2015/0149692 | A1* | 5/2015 | Wang | ................. | G06F 12/0253 711/103 |
| 2019/0205244 | A1* | 7/2019 | Smith | ................. | G06F 12/0866 |

FOREIGN PATENT DOCUMENTS

| | | |
|---|---|---|
| JP | 2007-226640 A | 9/2007 |
| JP | 2015-22622 A | 2/2015 |
| JP | 2015-184796 A | 10/2015 |

OTHER PUBLICATIONS

Japanese-language Written Opinion (PCT/ISA/237) issued in PCT Application No. PCT/JP2016/081655 dated Jan. 31, 2017 (four (4) pages).
Extended European Search Report issued in counterpart European Application No. 16868313.4 dated Aug. 1, 2019 (eight (8) pages).

* cited by examiner

FIG. 3

| NAME | CURRENT VALUE |
|---|---|
| DIAGNOSIS START FLAG | 1 |
| DIAGNOSIS COMPLETION FLAG | 0 |
| ACCESS DESTINATION CHANGE FLAG | 0 |
| INTER-CORE INTERRUPTION FLAG | 1 |

FIG. 5

| NAME | CURRENT VALUE |
|---|---|
| TIMER COUNTER | 20 |
| DIAGNOSTIC AREA ADDRESS | 0x FFFF FFF |

FIG. 6

| NAME | ADDRESS | SAVING DESTINATION ADDRESS | DATA | DIAGNOSTIC RESULT |
|---|---|---|---|---|
| ENGINE ROTATIONAL FREQUENCY | | | | |
| TORQUE CONVERSION | | | | |
| IGNITION TIMING | | | | |
| INJECTION AMOUNT | | | | |
| : | | | | |

FIG. 7

| NAME | ADDRESS | SAVING SOURCE ADDRESS | SAVING SOURCE DATA |
|---|---|---|---|
| AREA 0 | 0x FFFF FFFF | 0x 0111 0000 | |
| AREA 1 | | | |
| AREA 2 | | | |
| ⋮ | | | |
| AREA N | | | |

VEHICLE CONTROL DEVICE

TECHNICAL FIELD

The present invention relates to a vehicle control device.

BACKGROUND ART

In recent year the computation amount of an embedded system such as an automotive control system increases year by year due to multi-functionalization, and the required computation performance of a Central Processing Unit (CPU) is continuously increasing. In the field of personal computers, such an increase in processing amount has been coped with by increasing the number of CPU cores (multi-coring). The embedded system is also not an exception. Multi-coring is progressing for a consumer-based system, the computation amount of which is large, and the restriction on the real-time performance of which is relatively low, the consumer-based system including, for example, a car navigation system and a portable telephone. As the result of the advancement and complication of the embedded system, it is expected that the computation amount exceeds a single core limit. Therefore, employment of multi-core is examined.

Meanwhile, for the purpose of the standardization of a software quality level and the facilitation of safety certification in the automotive industry, Functional safety standards ISO26262 (hereinafter referred to as "functional safety standards") were developed in 2011. The present standards prescribe a failure rate calculation method, a software design technique and the like over the whole system including hardware and software. In order to conform to the present standards, it is necessary to show the basis for ensuring safety. In general, the standards are conformed to by summarizing the knowledge and actual results in the conventional design as evidence.

ISO26262 requires that interference between pieces of software that differ in safety requirements is prevented. A general-purpose vehicle control system is configured by various control applications. Therefore, in recent years, attention is being paid to a mechanism for preventing mutual interaction between pieces of software that form a system, the mechanism including a time protection function and a memory protection function. More specifically, there is a function of, in a case where certain software runs away, preventing the software that has run away from accessing a memory area in which data used by other software is stored, and consequently from corrupting the data. It is known that when an AUTOSAR architecture is applied to a general-purpose vehicle control device, various kinds of ASIL software coexist in a vehicle control system, Therefore, in order to make existing software conform to ISO26266, a mechanism for preventing interference between pieces of software, speedup of processing related thereto, weight reduction, an improvement in reliability and the like, are required.

The undermentioned Patent Literature 1 discloses an electronic control device for automobile, the electronic control device including a multi-core processor (MPU), and discloses the feature of enhancing the reliability of important computation processing such as diagnostic processing, and enhancing the safety of automotive control. According to the above literature, a memory area is divided into an ordinary control area (ordinary computation area) used for a control program, and a high-safety area (important computation area) used for a diagnostic program. The high-safety area is loaded with a high-safety area diagnostic program that performs a memory diagnosis for the high-safety area, and an ordinary diagnostic program that performs a memory diagnosis for all areas. The high-safety area is subjected to the memory diagnosis twice.

CITATION LIST

Patent Literature

PTL 2015-022622 A

SUMMARY OF INVENTION

Technical Problem

In the multi-core system, each core independently operates, and therefore computation processing can be performed in parallel, which enables to increase efficiency in computation. However, in a case where cores share a storage device (for example, a memory), an access conflict occurs between the cores in the shared storage device. In general, the multi-core system is designed in such a manner that when an access conflict occurs, one core waits for the completion of processing of the other core. Therefore there is a possibility that an influence will be exerted on a throughput.

The present invention has been made taking the problem such as that described above into consideration, and an object of the present invention is to suppress computational efficiency degradation when diagnosing a shared storage area in a vehicle control device in which a plurality of computing units are employed.

Solution to Problem

The vehicle control device according to the present invention suppresses computational efficiency degradation by changing an access destination in a storage device while diagnosing a shared storage area that the storage device has.

Advantageous Effects of Invention

According to the vehicle control device according to the present invention, when a shared storage area is diagnosed, a memory area can be efficiently diagnosed while suppressing computational efficiency degradation caused by an access conflict between computing units.

BRIEF DESCRIPTION OF DRAWINGS

FIG. 3 is a drawing illustrating a configuration of a flag management table 51100 stored in a shared area 51, and an example of data.

FIG. 5 is a drawing illustrating a configuration of a diagnosis progress management table 51300 stored in the shared area 51, and an example of data.

FIG. 6 is a drawing illustrating a configuration of a shared area management table 51400 stored in the shared area 51, and an example of data.

FIG. 7 is a drawing illustrating a configuration of an auxiliary storage area management table 52100 stored in an auxiliary storage area 52, and an example of data.

DESCRIPTION OF EMBODIMENTS

First Embodiment

Figure 1:
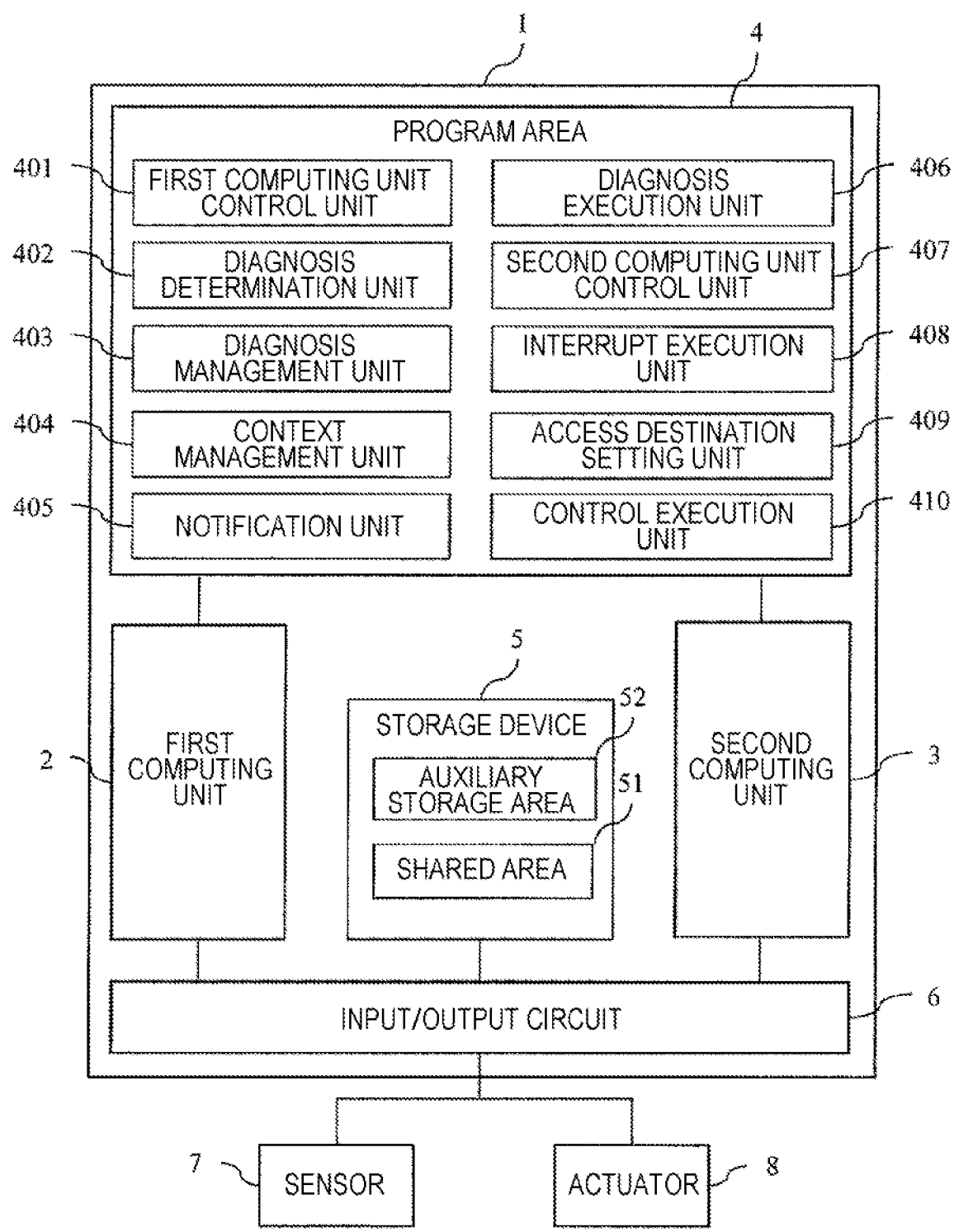
FIG. 1 is a block diagram illustrating a vehicle control device (ECU) 1 according to a first embodiment.

FIG. 1 is a block diagram illustrating the vehicle control device (ECU) 1 according to the first embodiment of the present invention. The ECU 1 is a device for controlling the operation of a vehicle, such as an engine control unit, and is provided with a first computing unit 2, a second computing unit 3, a program area 4, a storage device 5, and an input/output circuit 6. Here, a throttle sensor 7 and an actuator 8 are presented as devices to which the ECU 1 is connected. However, devices to which the ECU 1 is connected are not limited to the throttle sensor 7 and the actuator 8.

The first computing unit 2 and the second computing unit 3 are computing units that each execute a program stored in the program area 4. The first computing unit 2 and the second computing unit 3 are capable of executing programs stored in the program area 4 in parallel, and are further capable of accessing the program area 4 and the storage device 5 in parallel.

The program area 4 is a storage area configured on a nonvolatile storage device such as a Read Only Memory (ROM). The program area 4 stores the first computing unit control unit 401, the diagnosis determination unit 402, the diagnosis management unit 403, the context management unit 404, the notification unit 405, the diagnosis execution unit 406, the second computing unit control unit 407, the interrupt execution unit 408, the access destination setting unit 409, and the control execution unit 410.

The storage device 5 is a storage device such as a Random Access Memory (RAM). The storage device 5 includes the shared area 51 and the auxiliary storage area 52 as storage areas arranged in the same address space. The shared area 51 stores data used when the control execution unit 410 executes control computation, and stores data tables described in the undermentioned FIG. 3 to FIG. 6. The auxiliary storage area 52 stores a data table described in the undermentioned FIG. 7. Specific examples of the data stored in the storage areas will be described later.

Figure 2:
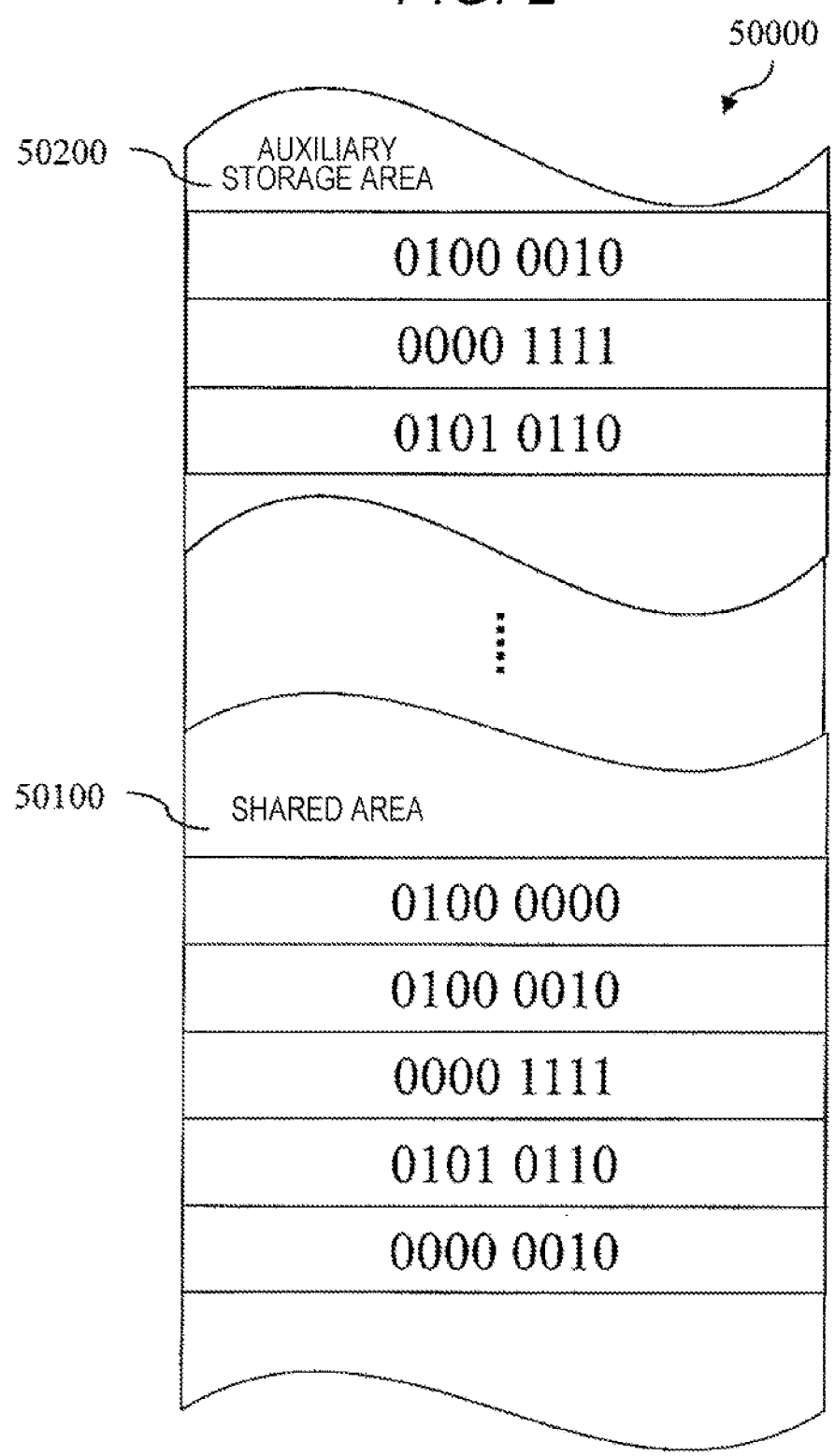
FIG. 2 is a drawing illustrating an address space 50000 of a storage device 5.

FIG. 2 is a drawing illustrating the address space 50000 of the storage device 5. The address space 50000 includes an auxiliary storage area address 50200, and a shared area address 50100. The shared area address 50100 indicates an area in which data recorded by the shared area 51 is stored. The auxiliary storage area address 50200 indicates an area in which data recorded by the auxiliary storage area 52 is stored.

FIG. 3 is a drawing illustrating a configuration of the flag management table 51100 stored in the shared area 51, and an example of data. The flag management table 51100 is a table that stores flags representing an operating state of each program described below. The flag management table 51100 includes a name field 51101, and a current value field 51102.

The name field 51101 holds names of respective flags managed by the flag management table 51100. The current value field 51102 holds current values of the respective flags. The respective flags and the values thereof shown in FIG. 3 will be described in conjunction with the operation of each program described below.

Figure 4:
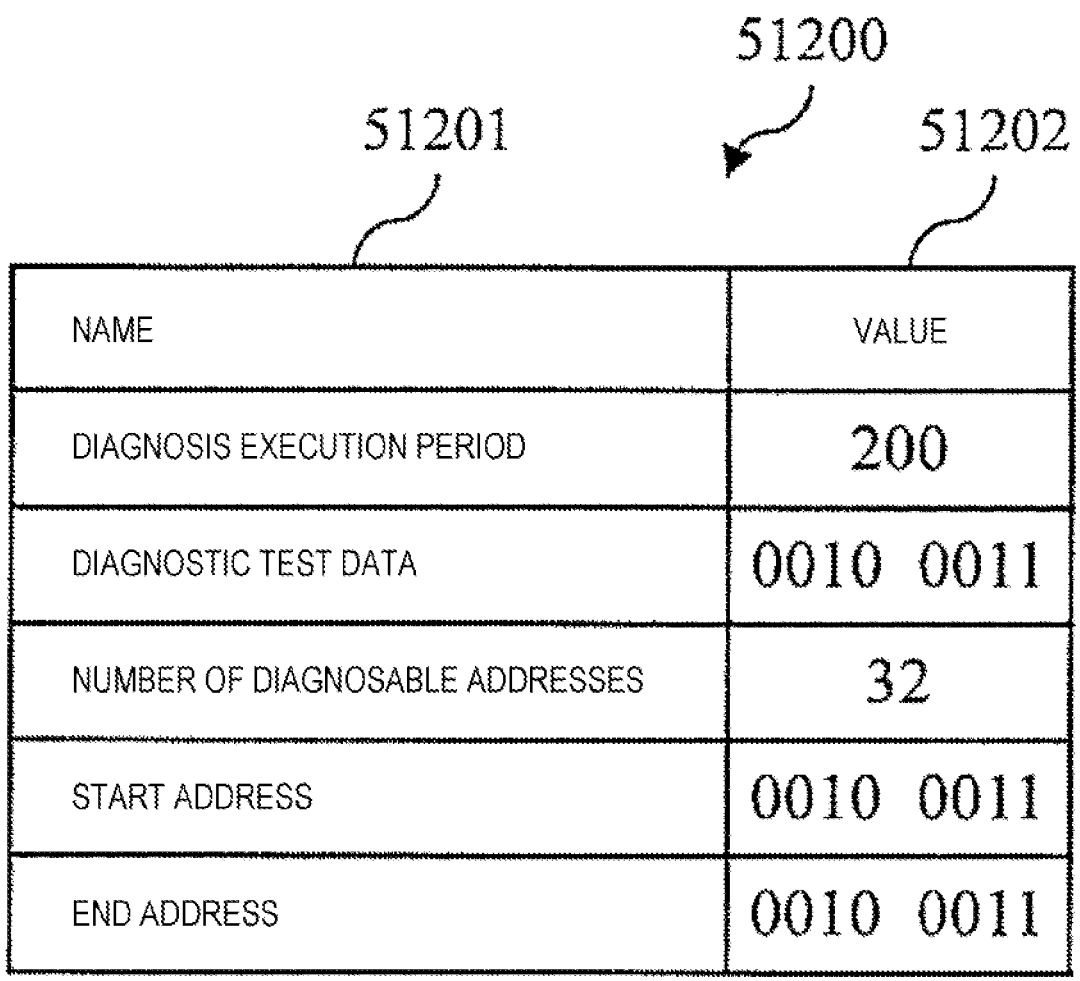
FIG. 4 is a drawing illustrating a configuration of a diagnosis parameter table 51200 stored in the shared area 51, and an example of data.

FIG. 4 is a drawing illustrating a configuration of the diagnosis parameter table 51200 stored in the shared area 51, and an example of data. The diagnosis parameter table 51200 is a data table that stores parameters related to memory diagnosis for the shared area 51. The diagnosis parameter table 51200 includes a name field 51201, and a value field 51202.

The name field 51201 holds names of respective parameters managed by the diagnosis parameter table 51200. The value field 51202 holds values of the respective parameters. The respective parameters and the values thereof shown in FIG. 4 will be described in conjunction with the operation of each program described below.

FIG. 5 is a drawing illustrating a configuration of the diagnosis progress management table 51300 stored in the shared area Si, and an example of data. The diagnosis progress management table 51300 is a data table for managing the progress of memory diagnosis for the shared area 51. The diagnosis progress management table 51300 includes a name field 51301, and a current value field 51302.

The name field 51301 holds names of respective progress parameters managed by the diagnosis progress management table 51300. The current value field 51302 holds values of the respective progress parameters. The respective parameters and the values thereof shown in FIG. 5 will be described in conjunction with the operation of each program described below.

FIG. 6 is a drawing illustrating a configuration of the shared area management table 51400 stored in the shared area 51, and an example of data. The shared area management table 51400 is a data table that manages, on the shared area 51 side, a correspondence relationship between data stored in the shared area 51 and data stored in the auxiliary storage area 52. The shared area management table 51400 includes a name field 51401, an address field 51402, a saying destination address field 51403, a data field 51404, and a diagnostic result field 51405.

The name field 51401 holds names of respective pieces of data manages by the shared area management table 51400 (pieces of data managed by the shared area 51). The address field 51402 holds addresses on the shared area 51, at which the respective pieces of data managed by the shared area management table 51400 are stored. The saving, destination address field 51403 holds storing destination addresses on the auxiliary storage area 52, the storing destination addresses being used when respective pieces of data on the shared area 51 are saved in the auxiliary storage area 52 according to processing procedures described below. The data field 51404 holds values of the respective pieces of data managed by the shared area management table 51400. The diagnostic result field 51405 holds results of memory diagnoses for respective storage areas specified by the address field 51402.

The shared area 51 stores pieces of data corresponding to each record of FIG. 6. Each record of FIG. 6 corresponds to one storage area in the shared area 51, and it is assumed that one storage area stores one data value.

FIG. 7 is a drawing illustrating a configuration of the auxiliary storage area management table 52100 stored in the auxiliary storage area 52, and an example of data. The auxiliary storage area management table 52100 is a data table that manages, on the auxiliary storage area 52, the correspondence relationship between the data stored in the shared area 51 and the data stored in the auxiliary storage area 52. The auxiliary storage area management table 52100 includes a name field 52101, an address field 52102, a saving, source address field 52103, and a saving source data 52104.

The name field 52101 holds names of respective pieces of data managed by the auxiliary storage area management table 52100 (pieces of data stored in the auxiliary storage area 52). The name field 51401 is not always required to agree with the described name. The address field 52102 holds addresses on the auxiliary storage area 52, at which the respective pieces of data managed by the auxiliary storage area management table 52100 are stored. The saving source address field 52103 holds storing source addresses on the shared area 51, the storing source addresses being used when respective pieces of data on the shared area 51 are saved in the auxiliary storage urea 52 according to processing procedures described below. The saving source data 52104 holds values of the respective pieces of data managed by the auxiliary storage area management table 52100.

The configuration of the ECU 1 has been described as above. The operation of each program will be described below on the assumption that the first computing unit 2 performs memory diagnosis for the shared area 51, and the second computing unit 3 performs control computation.

Figure 8:
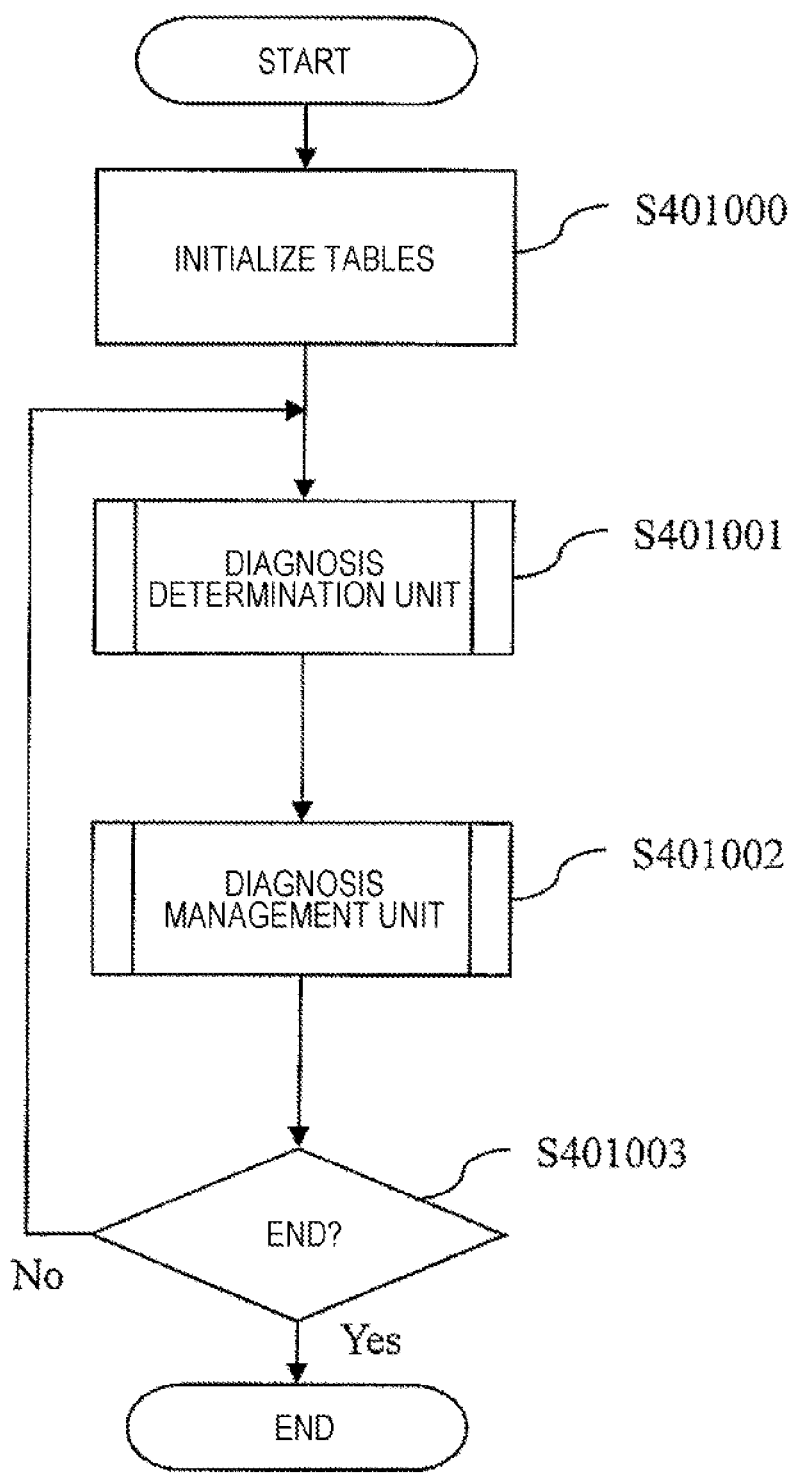
FIG. 8 is a flowchart illustrating the operation of a first computing unit control unit 401.

FIG. 8 is a flowchart illustrating the operation of the first computing unit control unit 401. For example, the first computing unit 2 periodically executes the present flowchart, thereby performing the memory diagnosis for the shared area 51. Each step of FIG. 8 will be described below.

(FIG. 8: Step S401000)

The first computing unit control unit 401 initializes each table (the flag management table 51100, the diagnosis progress management table 51300, the shared area management table 51400, and the auxiliary storage area management table 52100) managed by the storage device 5.

(FIG. 8: Step S401001)

The first computing unit control unit 401 calls the diagnosis determination unit 402. The operation of the diagnosis determination unit 402 will be described in the undermentioned FIG. 9. The diagnosis determination unit 402 plays a role in determining whether or not the timing of performing the memory diagnosis has come.

(FIG. 8: Step S401002)

The first computing unit control unit 401 calls the diagnosis management unit 403. The operation of the diagnosis management unit 403 will be described in the undermentioned FIG. 10. The diagnosis management unit 403 plays a role in controlling the whole operation of the memory diagnosis.

(FIG. 8: Step S401003)

The first computing unit control unit 401 determines whether or not end conditions are satisfied. When the end conditions are satisfied, the present flowchart is ended. When the end conditions are not satisfied, the process returns to the step S401001. The end conditions include, for example, that an instruction to switch off the power supply of the ECU 1 has been input.

Figure 9:
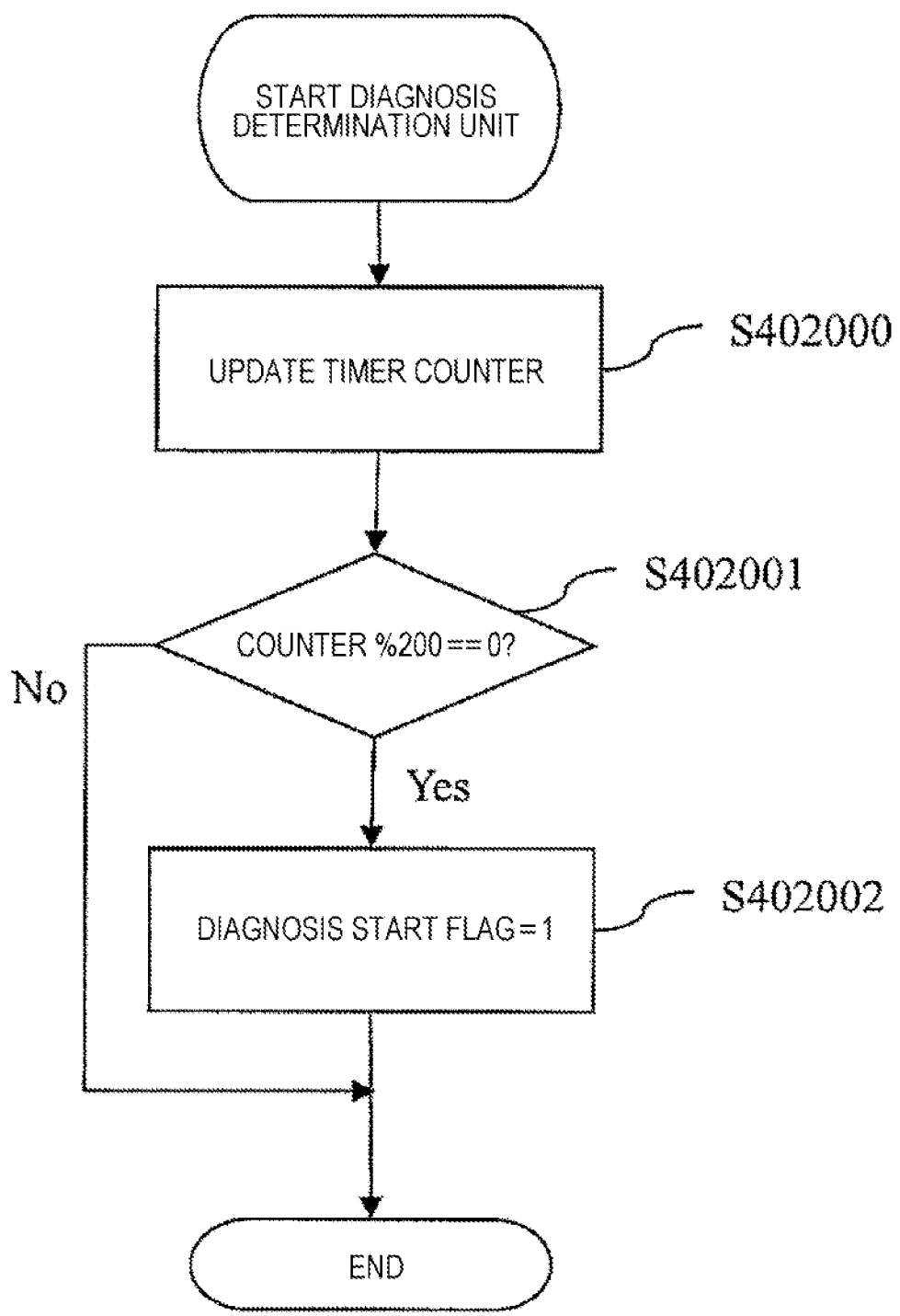
FIG. 9 is a flowchart illustrating the operation oft diagnosis determination unit 402.

FIG. 9 is a flowchart illustrating the operation of the diagnosis determination unit 402. Each step of FIG. 9 will be described below.

(FIG. 9: Step S402000)

The diagnosis determination unit 402 obtains the current value field 51302 corresponding to a timer counter from the diagnosis progress management table 51300. The diagnosis determination unit 402 increments a value of the tuner counter, and stores the incremental value in a corresponding field of the diagnosis progress management table 51300.

(FIG. 9: Step S402001)

The diagnosis determination unit 402 obtains the value field 51202 (200 in the illustrated example) corresponding to a diagnosis execution period from the diagnosis parameter table 51200. The diagnosis determination unit 402 calculates a remainder by dividing the obtained timer counter by the obtained diagnosis execution period. When the calculated remainder is 0, the process proceeds to the step S402001. In the other cases, the present flowchart ends.

(FIG. 9: Step S402002)

The diagnosis determination unit 402 stores 1 (value that indicates starting of the memory diagnosis) in the current value field 51102 corresponding to a diagnosis start flag stored in the flag management table 51100. By checking a value of this diagnosis start flag in a step S403000 described below the diagnosis management unit 403 is capable of determining whether or not the timing of starting the memory diagnosis has come.

Figure 10:
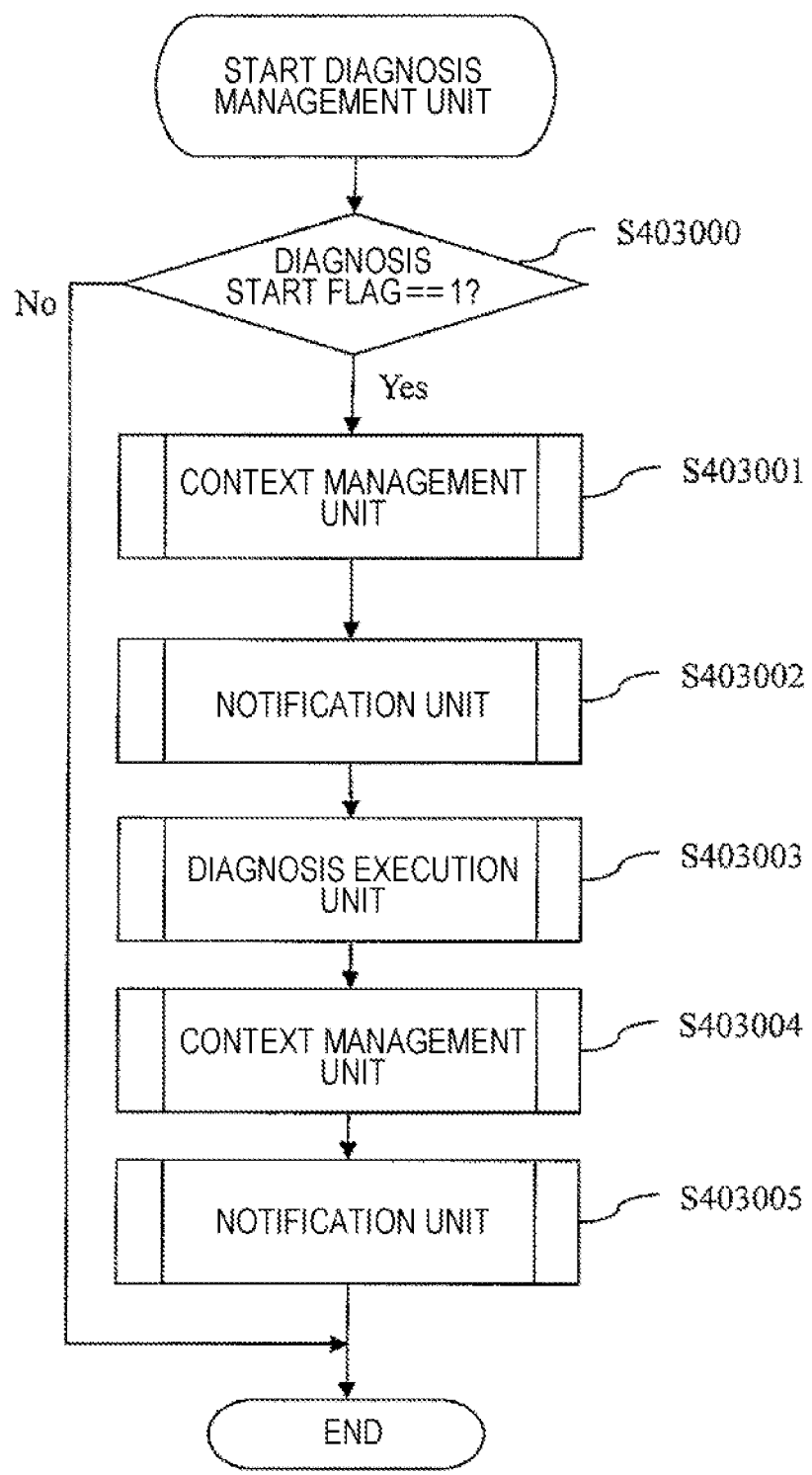
FIG. 10 is a flowchart illustrating the operation of a diagnosis management unit 403.

FIG. 10 is a flowchart illustrating the operation of the diagnosis management unit 403. Each step of FIG. 10 will be described below.

(FIG. 10: Step S403000)

The diagnosis management unit 403 obtains the current value field 51102 corresponding to the diagnosis start flag from the flag management table 51100. When the diagnosis start flag is 1, the process proceeds to a step S403001. In the other cases, the present flowchart ends.

(FIG. 10: Step S403001)

The diagnosis management unit 403 calls the context management unit 404. The operation of the context management unit 404 will be described in the undermentioned FIG. 11. The context management unit 404 plays a role in saving, in the auxiliary storage area 52, data stored in the shared area 51, or restoring the saved data from the auxiliary storage area 52 to the shared area 51. In the present step, data is saved in the auxiliary storage area 52.

(FIG. 10: Step S403002)

The diagnosis management unit 403 calls the notification unit 405. The operation of the notification unit 405 will be described in the undermentioned FIG. 12. The notification unit 405 plays a role in, when any of the computing units performs a memory diagnosis for the shared area 51, notifying the other computing unit of the above by interruption processing, or, after the completion of the diagnosis, notifying the other computing unit of the above. In the present step, the notification unit 405 notifies of starting of a diagnosis.

(FIG. 10: Step S403003)

The diagnosis management unit 403 calls the diagnosis execution unit 406. The operation of diagnosis execution unit 406 will be described in the undermentioned FIG. 13.

The diagnosis execution unit 406 plays a role in actually performing the memory diagnosis for the shared area 51.

(FIG. 10: Step S403004)

The diagnosis management unit 403 calls the context management unit 404 again. In the present step, the data saved in the auxiliary storage area 52 is written back to the shared area. 51.

(FIG. 10: Step S403005)

The diagnosis management unit 403 calls the notification unit 405, in the present step, the notification unit 405 notifies of the completion of the diagnosis.

Figure 11:
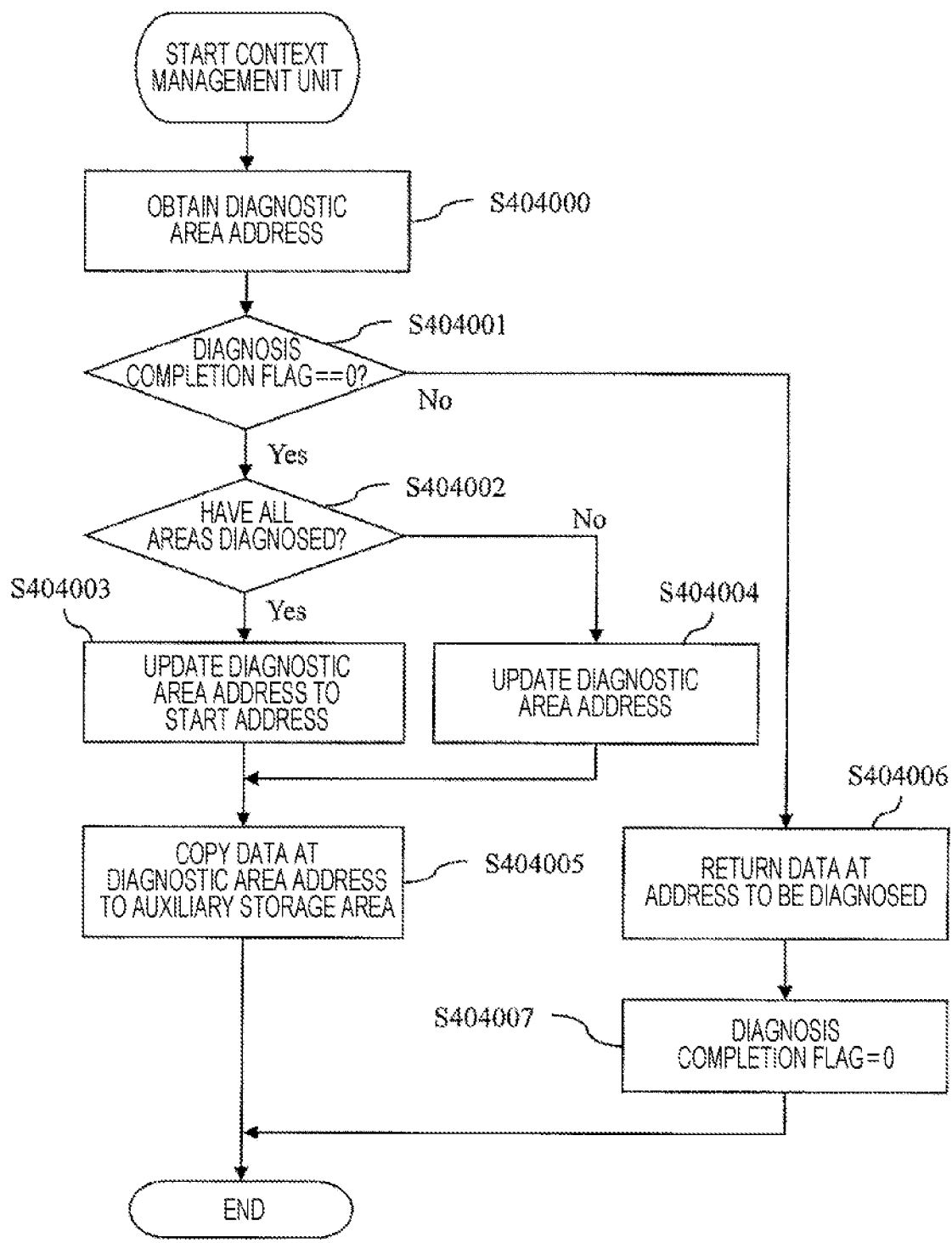
FIG. 11 is a flowchart illustrating the operation of a context management unit 404.

FIG. 11 is a flowchart illustrating the operation of the context management unit 404. Each step of FIG. 11 will be described below.

(FIG. 11: Step S404000)

The context management unit 404 obtains the current value field 51302 corresponding to a diagnostic area address from the diagnosis progress management table 51300. The diagnostic area address is a value indicating an address of an area to be diagnosed, Which is currently a target of a memory diagnosis. In a case where the diagnostic area address is not set, a value of the value field 51202 corresponding to a start address is obtained from the diagnosis parameter table 51200, and the value is stored in the current value field 51302 corresponding to the diagnostic area address. The start address is a value that specifies a head address of the storage area to be diagnosed. For example, a head address of the shared area 51 is specified.

(FIG. 11: Step S404001)

The context management unit 404 obtains the current value field 51102 corresponding to a diagnosis completion flag from the flag management table 51100. When the diagnosis completion flag is 0, the process proceeds to a step S404002. When the diagnosis completion flag is not 0, the process proceeds to a step S404006. The diagnosis completion flag is a flag indicating whether or not the memory diagnosis for the whole shared area 51 has been completed.

(FIG. 11: Step S404002)

The context management unit 404 obtains the value field 51202 corresponding to an end address from the diagnosis parameter table 51200. The end address is a value that specifies a termination address of the storage area to be diagnosed. For example, a termination address of the shared area 51 is specified. The context management unit 404 compares a current diagnostic area address with the end address. In a case where the current diagnostic area address agrees with the end address, the process proceeds to a step S404003. In a case where the current diagnostic area address does not agree with the end address, the process proceeds to a step S404004.

(FIG. 11: Step S404003)

The context management unit 404 obtains a value of the value field 51202 corresponding to the start address from the diagnosis parameter table 51200, and stores the value as a value of the current value field 51302 corresponding to the diagnostic area address in the diagnosis progress management table 51300. The present step is executed to return the start address to the head after the completion of the memory diagnosis.

(FIG. 11: Step S404004)

The context management unit 404 updates the current value field 51302 corresponding to the diagnostic area address to an address of the next area to be diagnosed. The diagnostic area address is incremented, for example, by using a numerical value obtained by multiplying, by the size of each storage area, the number of storage areas that can be diagnosed by the undermentioned diagnosis execution unit 406 at a time. The number of storage areas that can be diagnosed by the diagnosis execution unit 406 at a time can be specified by the value field 51202 corresponding to the number of diagnosable addresses in the diagnosis parameter table 51200. Considering that data is saved in the auxiliary storage area 52, it is preferable that the number of storage areas that can be diagnosed by the diagnosis execution unit 406 at a time be set in such a manner that the data size of a saving destination is the maximum size of the auxiliary storage area 52 or less.

(FIG. 11: Step S404005)

The context management unit 404 saves data stored at the diagnostic area address in the auxiliary storage area 52. More specifically, data that is stored in a storage area is copied to the auxiliary storage area 52, the storage area raging from the current value of the diagnostic area address to an address indicated by a numerical value obtained by multiplying the number of diagnosable addresses by the size of each storage area. The context management unit 404 stores, in the saving destination address field 51403, an address in the auxiliary storage area 52 in which data is saved, and stores an address in the shared area 51 before saving, and the saved data, in the saving source address field 52103 and in the saving source data 52104 respectively.

(FIG. 11: Step S404006)

The context management unit 404 uses the saving destination address field 51403 and the saving source address field 52103 as a copy source address and a copy destination address respectively, thereby copying the data saved in the auxiliary storage area 52 to the shared area 51. As the result, the saved data can be returned. However, as described below, there is also a case where the control execution unit 410 overwrites the data in the auxiliary storage area 52. Therefore, data values before and after copying are not always identical to each other.

(FIG. 11: Step S40407)

The context management unit 404 stores 0 in the current value field 51102 corresponding to the diagnosis completion flag in the flag management table 51100.

Figure 12:
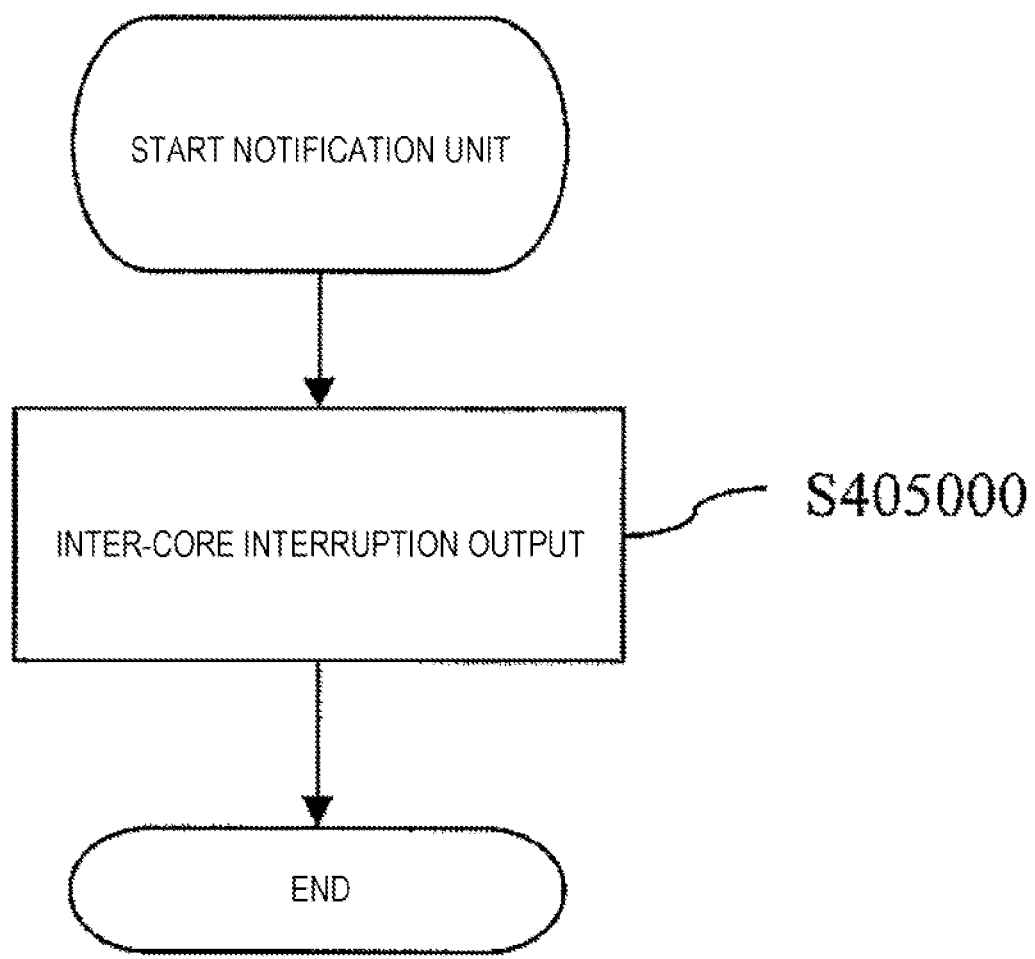
FIG. 12 is a flowchart illustrating the operation of a notification unit 405.

FIG. 12 is a flowchart illustrating the operation of the notification unit 405. Each step of FIG. 12 will be described below.

(FIG. 12: Step S405000)

The notification unit 405 causes interruption processing to occur the interruption processing notifying the second computing unit 3 that a diagnosis for the shared area 51 has been started. In order to prevent a notification from delaying, it is desirable to use interruption processing. However, if it is expected that the delay falls within an allowable range, the notification may be made by using other techniques.

Figure 13:
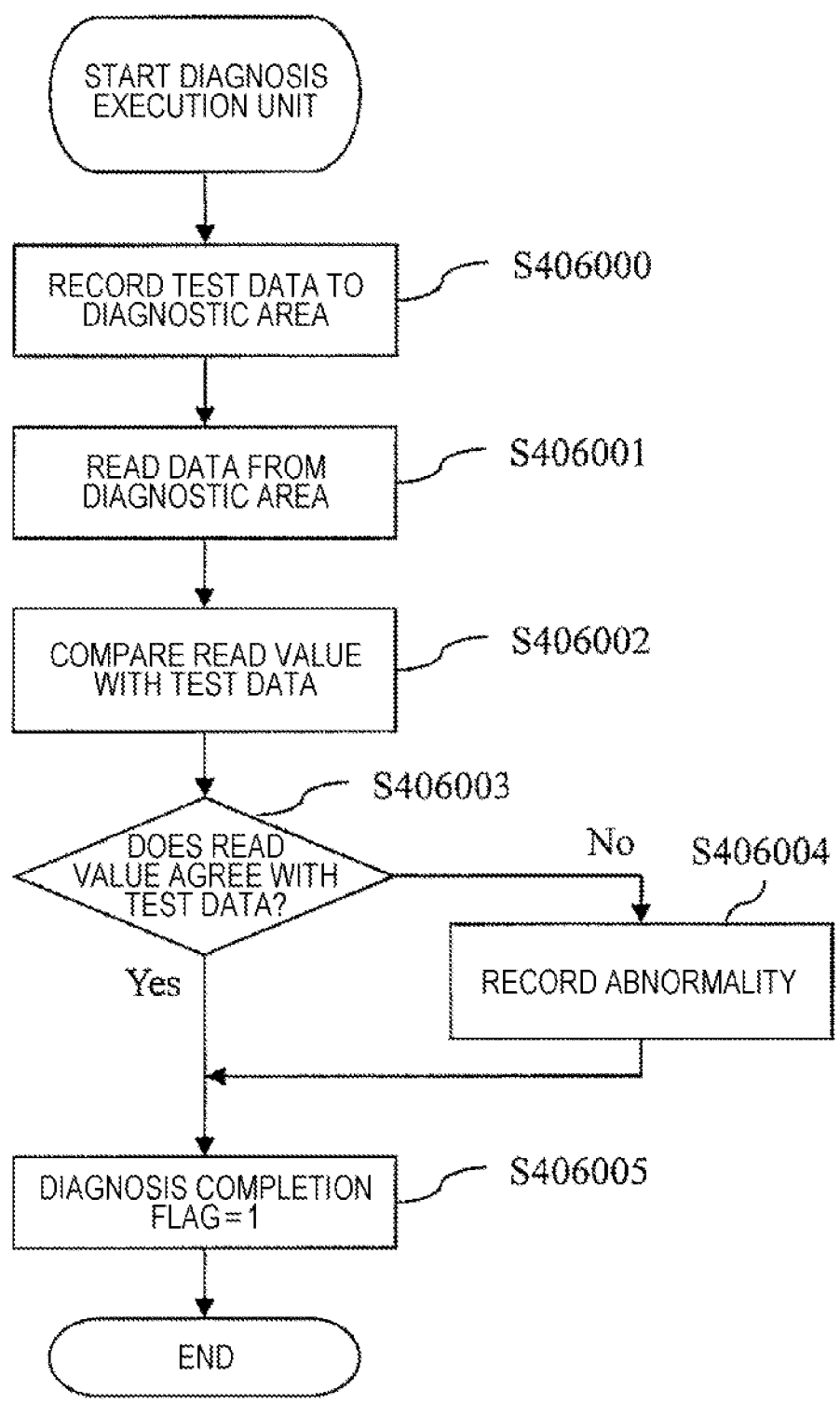
FIG. 13 is a flowchart illustrating the operation of a diagnosis execution unit 406.

FIG. 13 is a flowchart illustrating the operation of the diagnosis execution unit 406. Each step of FIG. 13 will be described below.

(FIG. 13: Step S406000)

The diagnosis execution unit 406 obtains the value field 51202 corresponding to diagnostic test data from the diagnosis parameter table 51200. The diagnosis execution unit 406 writes the obtained diagnostic test data at the diagnostic area address.

(FIG. 13: Step S406001)

The diagnosis execution unit 406 reads data from the diagnostic area address.

(FIG. 13: step S406002 to S406003)

The diagnosis execution unit 406 compares the data read in the step S406001 with the diagnostic test data written in the step S406000 (S406002). In a case where both data agree with each other, the process proceeds to a step S406005. In a case where both data do not agree with each other, the process proceeds to a step S406004.

(FIG. 13: Step S406004)

The diagnosis execution unit 406 records, in the diagnostic result field 51405 of the shared area management table 51400, a value indicating that the area is abnormal (for example, 0 is normal, 1 is abnormal, etc.).

(FIG. 13: step S406000 to S406004: Supplementary)

The diagnosis execution unit 406 is capable of executing these steps in parallel by the number of storage areas specified by the number of diagnosable addresses. These steps can be executed in parallel, for example, for 32 storage areas starting from a diagnosis start address. This enables to collectively execute memory diagnoses by the number of storage areas specified by the number of diagnosable addresses. As an alternative to executing these steps in parallel, collective diagnoses can also be similarly performed by repeatedly executing these steps while internally incrementing a target address.

(FIG. 13: Step S406005)

The diagnosis execution unit 406 stores 1 in the current value field 51102 corresponding to the diagnosis completion flag in the flag management table 51100.

Figure 14:
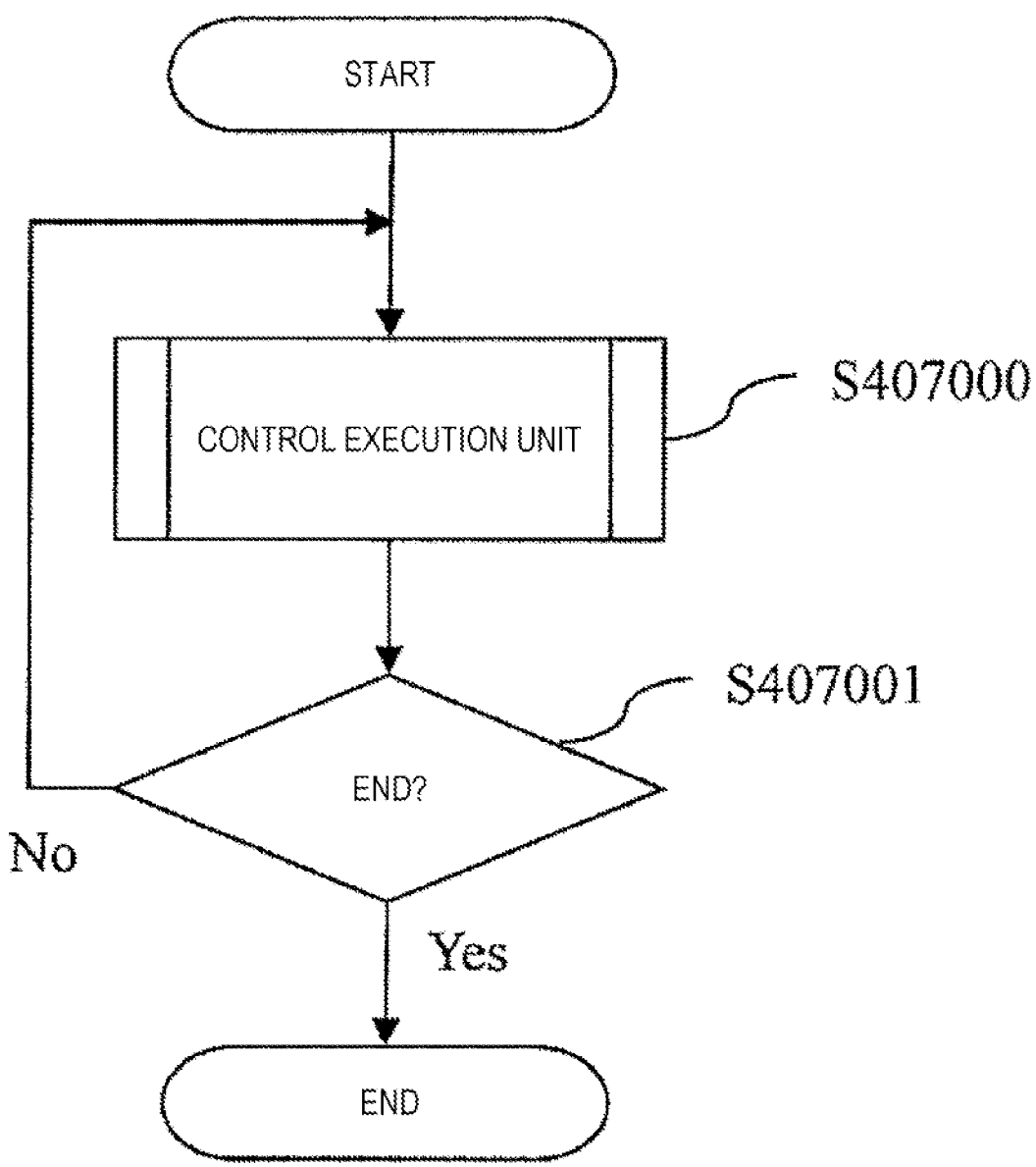
FIG. 14 is a flowchart illustrating the operation of a second computing unit control unit 407.

FIG. 14 is a flowchart illustrating the operation of the second computing rant control unit 407. The second computing unit 3 performs control computation, for example, by periodically executing the present flowchart. Each step of FIG. 14 will be described below.

(FIG. 14: Step S407000)

The second computing unit control unit 407 calls the control execution unit 410. The operation of the control execution unit 410 will be described in the undermentioned FIG. 17. The control execution unit 410 plays a role in performing the control computation.

(FIG. 14: Step S407001)

The second computing unit control unit 407 determines whether or not end conditions are satisfied. When the end conditions are satisfied, the present flowchart is ended. When the end conditions are not satisfied, the process returns to the step S407000. The end conditions include, for example, that an instruction to switch off the power supply of the ECU 1 has been input.

Figure 15:
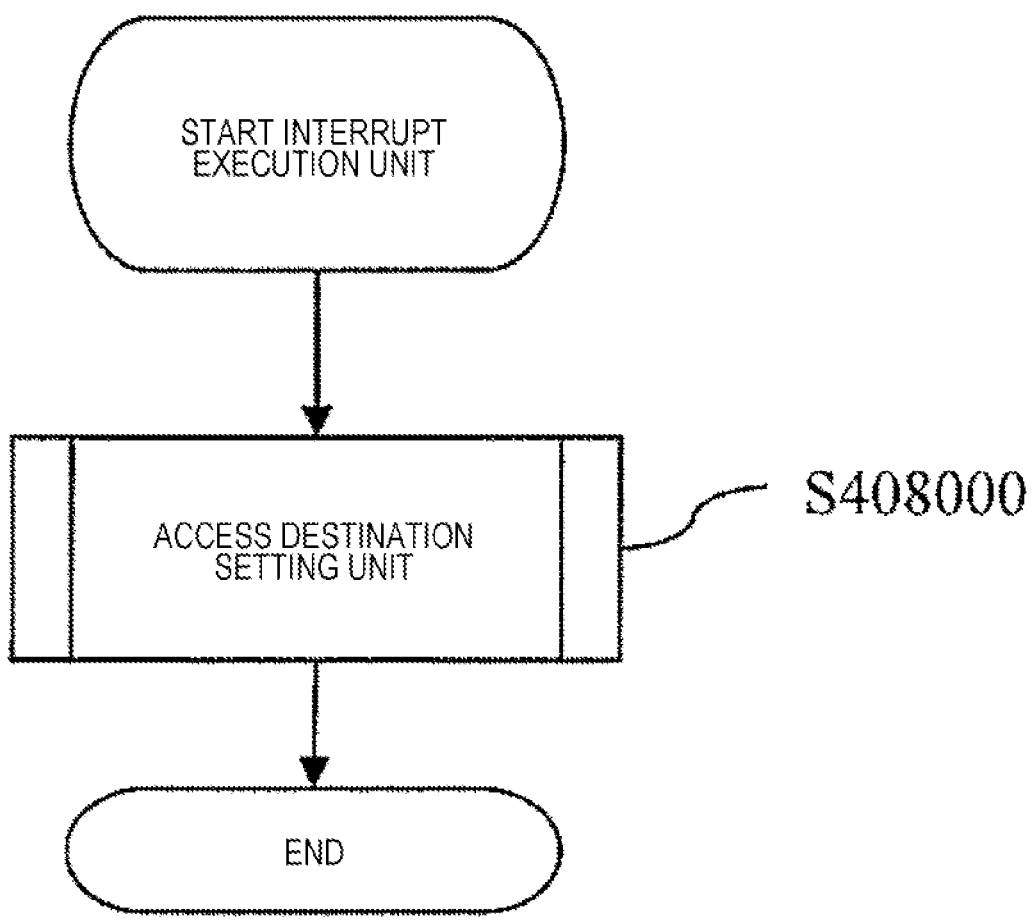
FIG. 15 is a flowchart illustrating the operation of an interrupt execution unit 408.

FIG. 15 is a flowchart illustrating the operation of the interrupt execution unit 408. When interruption processing described in the step S405000 occurs, the second computing unit 3 starts the present flowchart, and executes the interrupt execution unit 408. Each step of FIG. 15 will be described below.

(FIG. 15: Step S408000)

The interrupt execution unit 408 calls the access destination setting unit 409. The operation of the access destination setting unit 409 will be described in the undermentioned FIG. 16. The access destination setting unit 409 plays a role in switching between using data stored in the shared area 51 to perform the control computation and using data stored in the auxiliary storage area 52 to perform the control computation.

Figure 16:
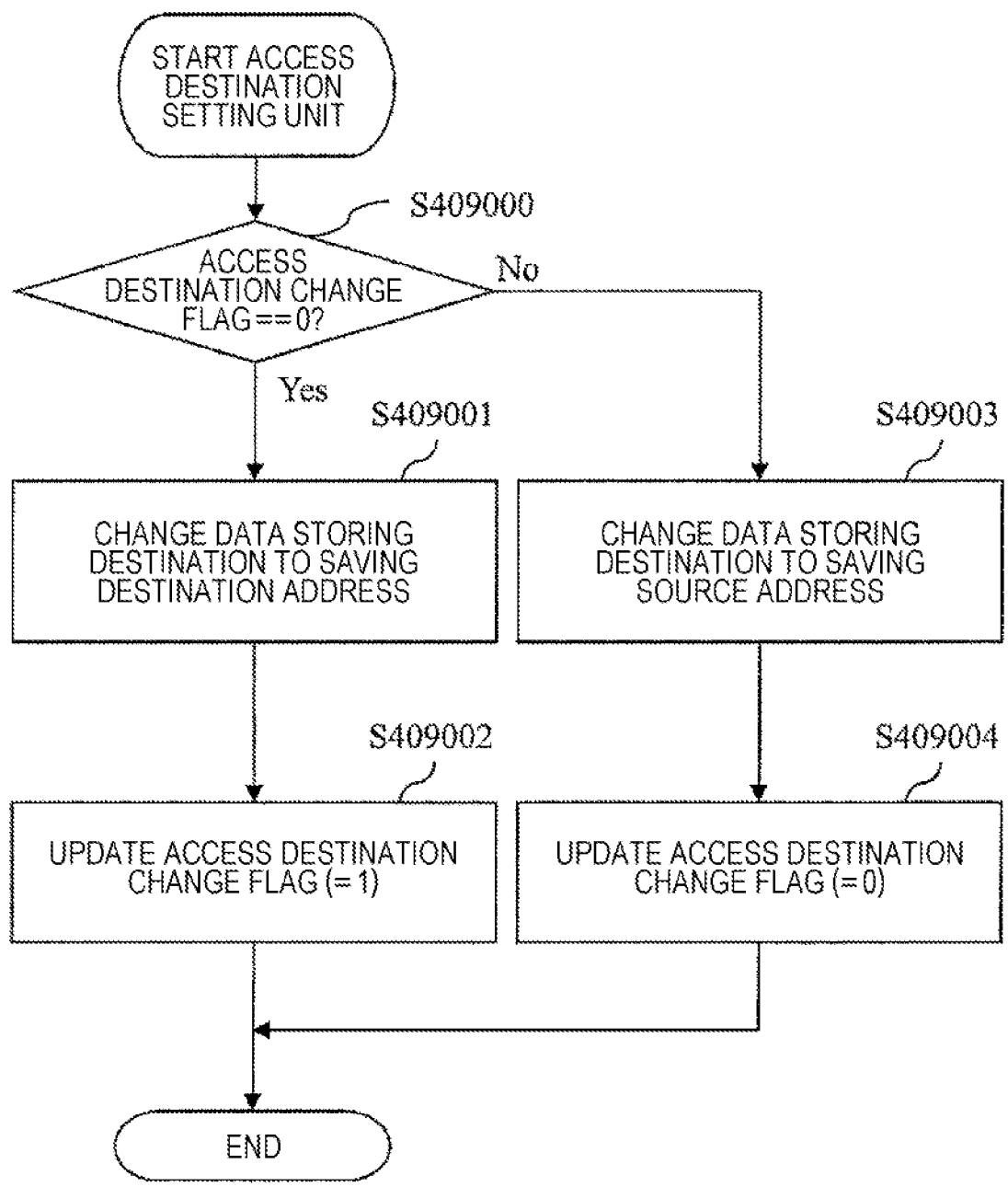
FIG. 16 is a flowchart illustrating the operation of an access destination setting unit 409.

FIG. 16 is a flowchart illustrating the operation of the access destination setting unit 409. Each step of FIG. 16 will be described below.

(FIG. 16: Step S409000)

The access destination setting unit 409 obtains the current value field 51102 corresponding to an access destination change flag from the flag management table 51100. When a value of the access destination change flag is 0, the process proceeds to a step S409001. When the value of the access destination change flag is 1, the process proceeds, to a step S409003.

(FIG. 16: Step S409001)

The access destination setting unit 409 obtains the current value field 51302 corresponding to the diagnostic area address from the diagnosis progress management table 51300, and obtains the value field 51202 corresponding to the number of diagnosable addresses from the diagnosis parameter table 51200. With respect to storage areas corresponding to the obtained diagnostic area address and the obtained number of diagnosable addresses among storage areas managed by the shared area management table 51400, the access destination setting unit 409 changes an access destination in slid a manner that the control execution unit 410 reads/write data from/to a corresponding storage area of the auxiliary storage area 52. Since the second computing unit 3 executes the present flowchart, the second computing unit 3 itself may change the access destination, or data such as a flag indicating which storage area to be accessed may be held in an appropriate storage area.

(FIG. 16: Step S409002)

The access destination setting unit 409 updates the current value field 51102 corresponding to the access destination change flag in the flag management table 51100 to 1.

(FIG. 16: Step S409003)

The access destination setting unit 409 obtains the current value field 51302 corresponding to the diagnostic area address from the diagnosis progress management table 51300, and obtains the value field 51202 corresponding to the number of diagnosable addresses from the diagnosis parameter table 51200. With respect to storage areas corresponding to the obtained diagnostic area address and the obtained number of diagnosable addresses among storage areas managed by the shared area management table 51400, the access destination setting unit 409 changes an access destination in such a manner that the control execution unit 410 reads/writes data from/to a corresponding storage area of the shared area 51. The specific means is similar to that of the step S409001.

(FIG. 16: Step S409004)

The access destination setting unit 409 updates the current value field 51102 corresponding to the access destination change flag in the flag management table 51100 to 0.

Figure 17:
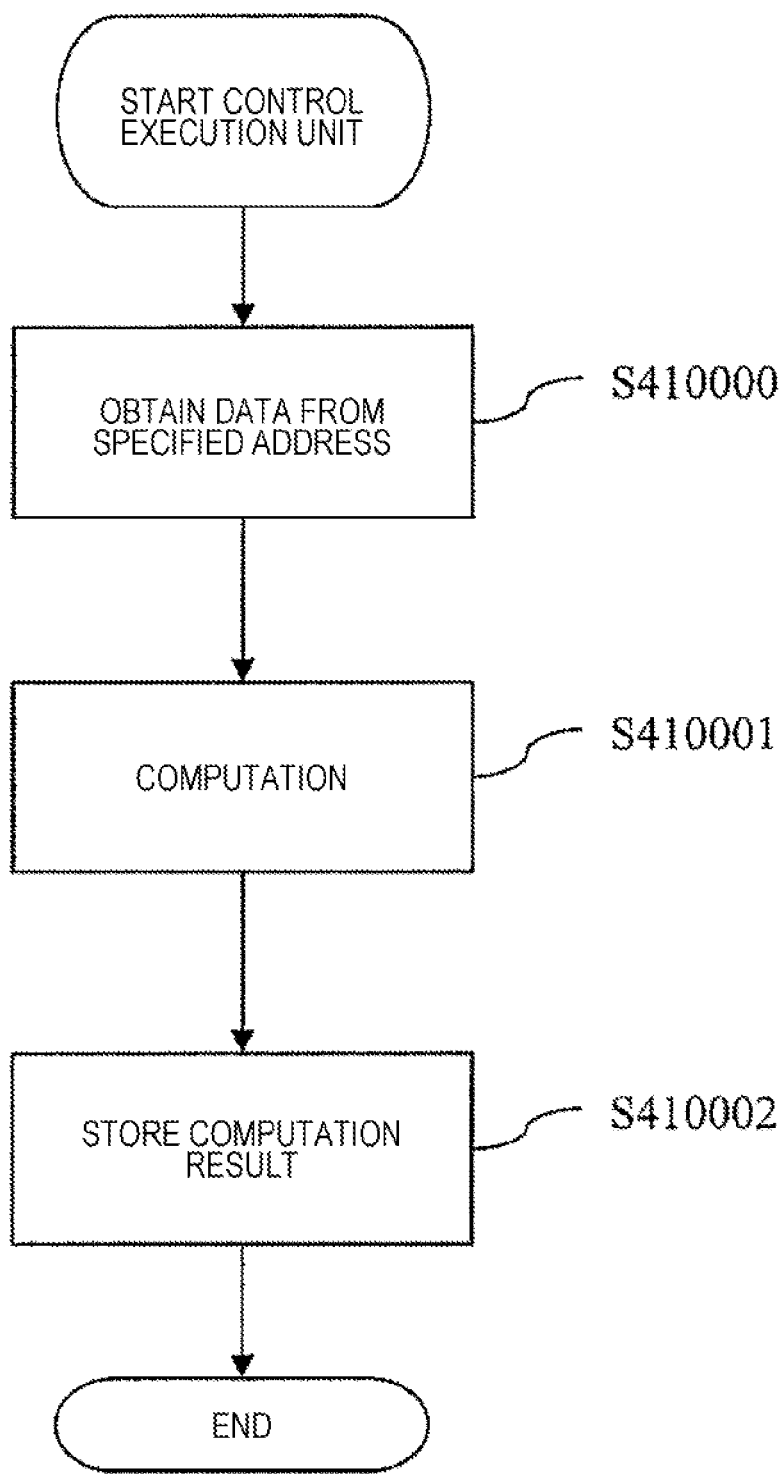
FIG. 17 is a flowchart illustrating the operation of a control execution unit 410.

FIG. 17 is a flowchart illustrating the operation of the control execution unit 410. Each step of FIG. 17 will be described below.

(FIG. 17: Step S410000)

The control execution unit 410 obtains data required for the control computation from the shared area 51 or the auxiliary storage area 52. From which storage area the data is obtained is specified in the step S4019001 or S409003. An access destination address used when the data is saved in the auxiliary storage area 52 can be obtained from the saving destination address field 51403.

(FIG. 17: Step S410001)

The control execution unit 410 performs the control computation by using the data obtained in the step S410000.

(FIG. 17: Step S410002)

The control execution unit 410 writes the result of the control computation to the storage area from which the data is obtained in the step S410000. Even in a case where the computation result has been written to the auxiliary storage area 52, the written data is reflected in the shared area 51 by the step S404006. Therefore, the consistency of the control computation can be maintained.

First Embodiment: Summary

While the memory diagnosis for the shared area 51 is performed, the ECU 1 according to the present first embodiment saves, in the auxiliary storage area 52, data in the area to be diagnosed, and the computing unit performs the control computation by using the saved data. As the result the efficiency in the use of the computing unit can be increased during the memory diagnosis as well.

While data is saved in the auxiliary storage area 52, the ECU 1 according to the present first embodiment writes the result of the control computation to the auxiliary storage area 52. When the memory diagnosis ends, the ECU 1 writes back the written computation result to the shared area 51. This enables to perform the memory diagnosis with the efficiency in the use of the computing unit maintained, and also to maintain the consistency of the control computation before and after the memory diagnosis.

Second Embodiment

In the first embodiment, the shared area 51 and the auxiliary storage area 52 are configured as part of the storage device. However, these storage areas can also be configured on respective storage devices that differ from each other. For example, while the shared area 51 is constructed on the PAM, the auxiliary storage area 52 can be constructed on a memory unit having a reliability higher than that of the RAM. This another memory unit may be arranged in the ECU 1, or may be provided outside the ECU 1 so as to be accessed from the ECU 1.

As the memory unit having a reliability higher than that of the RAM, for example, a register memory provided with an exclusive control function can be considered. In this case, while any of the computing units writes data to the register memory, the register memory itself rejects writing (or both reading and writing) of data by the other computing unit. This enables to prevent the storage area from being corrupted due to the conflict of writing data, and therefore the reliability of the storage area increases nu comparison with general-purpose RAMs.

In a case where the shared area 51 and the auxiliary storage area 52 are configured on respective storage devices that differ from each other, the address space 50000 can be shared therebetween. As the result, only the access destination address enables to control which storage device to be accessed, and therefore similar effects can be exhibited by processing similar to that in the first embodiment.

Third Embodiment

In the first and second embodiments, the first computing unit 2 performs the memory diagnosis for the shared area 51, and the second computing unit 3 performs the control computation. However, both of the computing units may perform the memory diagnosis and the control computation, or while any of the computing units performs only the memory diagnosis, the other computing unit may perform both the memory diagnosis and the control computation.

For example, it is considered that a computing unit that writes data to a storage area in the shared area 51 performs a memory diagnosis for the storage area by itself. In a case where a computing unit that writes data to each storage area is fixed beforehand, this technique is useful. Alternatively, it is considered that a computing unit having the highest frequency of writing data to a storage area in the shared area 51 performs a memory diagnosis for the storage area by itself.

Modified Example of the Present Invention

The present invention, is not limited to the abovementioned embodiments, and includes various modified examples. For example, the above-mentioned embodiments are described in detail in order to clearly explain the present invention. Therefore, the present invention is not always limited to the invention having all of the disclosed configurations. In addition, a configuration of a certain embodiment may be partially replaced with a configuration of another embodiment, and a configuration of another embodiment may be added to a configuration of a certain embodiment. Moreover, an addition, deletion or replacement of a configuration of another embodiment may be made to a part of a configuration of each embodiment.

In the abovementioned embodiments, the ECU 1 is provided with two computing units. However, the number of computing units is not limited to two. A system in which one package is provided with three or more processors or processor cores, and a system that is configured by a plurality of packages each having a processor core, are also targeted by the present invention.

In the abovementioned embodiments, FIG. 1 is presented as a configuration of the ECU 1. However, the ECU 1 may have other configurations. The ECU 1 can also be provided with, for example, a nonvolatile memory (backup RAM) that saves data, a local memory that can be accessed by each computing, unit at high speed, and a sensor other than that presented in FIG. 1.

In FIG. 2, the shared area 51 and the auxiliary storage area 52 are presented as the storage area managed by the address space 50000. However, other storage areas can also be managed on the address space 50000. For example, an address of a local memory, an external storage device, a register or the like in each computing unit can also be managed on the address space 50000.

Among pieces of data that are held by each table stored in the shared area 51, at least a part of fields can also be stored in another storage device. Those fields can also be stored, for example, in a local storage area included in each computing unit.

In the abovementioned embodiments, the saving destination address field 51403 is provided as a field for storing the saving destination address when data is saved in the auxiliary storage area 52. However, a method for managing the saving, destination address is not limited to this. The saving destination address can be managed, for example, by using a relative address from an address at which data is usually stored.

In the abovementioned embodiments, the result of the memory diagnosis is represented as, for example, a binary, 0 (normal) and 1 (abnormal). However, a value stored as the diagnostic result is not limited to this. For example, according to the frequency with which an abnormality has been detected, and the integrated wither of times, values that indicate different diagnostic results respectively may be stored.

In the step S405000, the starting or ending of a diagnosis is notified of by causing interruption processing for the computing unit to occur. However, a notification methods not limited to this. For example, by storing, in any storage area in the address space 50000, a flag that informs of the starting/ending of a diagnosis, the starting/ending can be notified of. The flag in line 4 of FIG. 3 indicates the notification.

In the abovementioned embodiments, the memory diagnosis is performed by writing test data, and then by determining whether or not the same value can be read. However, the memory diagnosis technique is not limited to this, and other appropriate techniques can be used.

REFERENCE SIGNS LIST

1 vehicle control device (ECU)
2 first computing unit
3 second computing unit
4 program area
401 first computing unit control unit
402 diagnosis determination unit
403 diagnosis management unit
404 context management unit
405 notification unit
406 diagnosis execution unit
407 second computing unit control Hut
408 interrupt execution unit
409 access destination setting unit
410 control execution unit
5 storage device
6 input/output circuit
7 throttle sensor
8 actuator

The invention claimed is:

1. A vehicle control device that controls operation of a vehicle, the vehicle control device comprising:
first and second computing units that execute control computation for controlling the operation of the vehicle;
a memory diagnosis unit that diagnoses a shared storage area shared by the first and second computing units;
an auxiliary storage unit that stores a copy of data stored in an area to be diagnosed, the area being diagnosed by the memory diagnosis unit; and
an access destination setting unit that sets an access destination address in such a manner that while the memory diagnosis unit diagnoses the area to be diagnosed, the first and second computing units execute the control computation by using the copy stored in the auxiliary storage unit as an alternative to the data stored in the area to be diagnosed, wherein
the vehicle control device further includes an auxiliary storage device that is a storage device different from the shared storage device, and that has an auxiliary storage area, and
the auxiliary storage device is configured as a storage device having a reliability higher than a reliability of the shared storage device by being configured as an exclusive storage device in which while one of the computing units writes data, an access from the other computing unit is excluded.

2. The vehicle control device according to claim 1, wherein
the memory diagnosis unit is configured as a memory diagnosis program that is provided with a processing function of diagnosing the shared storage area,
the first computing unit diagnoses the shared storage area by executing the memory diagnosis unit,
the vehicle control device further includes a notification unit for, when the first computing unit starts executing the memory diagnosis unit, notifying the access destination setting unit that the shared storage area is being diagnosed, and
when the access destination setting unit is notified by the notification unit that the shared storage area is being diagnosed, the access destination setting unit sets the access destination address in such a manner that the second computing unit accesses the auxiliary storage unit as an alternative to the area to be diagnosed.

3. The vehicle control device according to claim 2, wherein
when the first computing unit completes the execution of the memory diagnosis unit, the notification unit notifies the access destination setting unit that the diagnosis for the shared storage area has been completed, and
when the access destination setting unit is notified by the notification unit that the diagnosis for the shared storage area has been completed, the access destination setting unit sets the access destination address in such a manner that the second computing unit accesses the area to be diagnosed, which is the area of shared storage that completed the diagnosis, as an alternative to the auxiliary storage unit.

4. The vehicle control device according to claim 1, wherein
the vehicle control device includes a memory unit accessed by the first and second computing units, and
both of the shared storage area and the auxiliary storage unit are configured as storage areas included in the memory unit.

5. The vehicle control device according to claim 1, wherein
the vehicle control device includes a shared storage device having the shared storage area,
the auxiliary storage unit is configured as the auxiliary storage area for storing the copy.

6. The vehicle control device according to claim 5, wherein
the auxiliary storage device is configured by a storage device having a reliability higher than a reliability of the shared storage device.

7. The vehicle control device according to claim 1, wherein
the shared storage area stores diagnosis count data that specifies the number of the areas to be diagnosed that are collectively diagnosed by the memory diagnosis unit,
the auxiliary storage unit has a storage capacity that is capable of storing the copies of the areas to be diagnosed, the number of which is larger than or equal to the number of the areas to be diagnosed specified by the diagnosis count data,
the memory diagnosis unit collectively diagnoses the areas to be diagnosed, the number of which is specified by the diagnosis count data, and
the access destination address setting unit sets the access destination address in such a manner that during a period after the memory diagnosis unit starts diagnosing the shared storage area until the memory diagnosis unit completes diagnosing the areas to be diagnosed, the number of which is specified by the diagnosis count data, the first and second computing units execute the control computation by using multiple copies of the access destination address, which is also stored simultaneously in the auxiliary storage unit as an alternative to the data stored in the area to be diagnosed.

8. The vehicle control device according to claim 1, wherein the shared storage area stores saving destination address data that describes an address at which the copy is stored in the auxiliary storage unit, and the first and second computing units obtain the copy from the address in the auxiliary storage unit, the address being described by the saving destination address data.

9. The vehicle control device according to claim 8, wherein the auxiliary storage unit stores saving source address data that describes an address at which the area to be diagnosed is stored in the shared storage area, and after the diagnosis for the shared storage area has been completed, the first computing unit obtains data stored at the address in the auxiliary storage unit, the address being described by the saving destination address data, and writes back the obtained data at the address described by the saving source address data.

10. The vehicle control device according to claim 1, wherein the memory diagnosis unit is configured as a memory diagnosis program that is provided with a processing function of diagnosing the shared area, and the first and second computing units perform the diagnosis by executing the memory diagnosis unit in areas, to which the first and second computing units themselves write data respectively, in the shared storage area.

11. The vehicle control device according to claim 1, wherein the memory diagnosis unit is configured as a memory diagnosis program that is provided with a processing function of diagnosing the shared storage area, and the first and second computing units perform the diagnosis by executing the memory diagnosis unit.

\* \* \* \* \*